US006569913B1

(12) United States Patent
Huygens et al.

(10) Patent No.: US 6,569,913 B1
(45) Date of Patent: May 27, 2003

(54) ISOCYANATE-TERMINATED PREPOLYMERS

(75) Inventors: Eric Huygens, Heverlee (BE); Pierre Gilbert Henri Jean Chaffanjon, Tervuren (BE); Shpresa Kotaji, Nodebais (BE); Peter Frans Eugeen Maria Stroobants, Ham (BE)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/560,404

(22) Filed: Apr. 28, 2000

Related U.S. Application Data

(63) Continuation of application No. 09/021,503, filed on Feb. 10, 1998, now abandoned.

(30) Foreign Application Priority Data

Feb. 10, 1997 (EP) .............................................. 97102067

(51) Int. Cl.[7] .......................... C08J 9/08; C08G 18/10; C08G 18/48; C08G 18/76
(52) U.S. Cl. ....................... 521/159; 521/130; 521/160; 521/174; 521/176
(58) Field of Search ................................. 521/159, 160, 521/130, 174, 176

(56) References Cited

U.S. PATENT DOCUMENTS

| 4,261,852 A | 4/1981 | Carroll et al. ............... 521/159 |
| 5,070,114 A | 12/1991 | Watts et al. ................. 521/159 |
| 5,114,989 A | 5/1992 | Elwell et al. ............... 521/159 |
| 5,436,277 A | 7/1995 | Narayan et al. ............. 521/160 |
| 5,459,221 A | 10/1995 | Narayan et al. ............. 521/159 |
| 5,491,252 A | 2/1996 | Narayan et al. ............. 521/159 |
| 5,494,942 A | 2/1996 | Ottens et al. ................ 521/159 |
| 5,532,285 A | 7/1996 | Narayan et al. ............. 521/159 |
| 5,532,403 A | 7/1996 | Narayan et al. ............. 521/159 |
| 5,665,288 A | 9/1997 | Narayan et al. ............... 264/53 |

FOREIGN PATENT DOCUMENTS

EP          420 273         4/1991

*Primary Examiner*—Rabon Sergent
(74) *Attorney, Agent, or Firm*—Pillsbury Winthrop LLP

(57) ABSTRACT

Novel isocyanate-terminated prepolymers and a process for making flexible polyurethane foams thereof. The prepolymers are made from polyether polyols having a high equivalent weight.

9 Claims, No Drawings

ISOCYANATE-TERMINATED PREPOLYMERS

This is a continuation of application Ser. No. 09/021,503, filed Feb. 10, 1998, now abandoned.

The present invention is concerned with new isocyanate-terminated prepolymers made from polyols having a high molecular weight and with the preparation of flexible polyurethane foams using such prepolymers.

U.S. Pat. No. 4,687,851 discloses the preparation of polyurethane and/or polyurea polymers which are the reaction product of a reaction mixture comprising a polyisocyanate and a polyether polyahl having an equivalent weight of at least 2000 and a level of unsaturation of less than 0.1% by weight. The object of this patent was to use high molecular weight polyols having a low level of unsaturation leading to elastomeric and flexible materials having high resilience, excellent tensile properties and compression set and a low glass transition temperature. The use of polyols having a moderate equivalent weight (250–2000) has been disclosed as well; no special directions are given how to use such polyols especially not together with water. All examples relate to the preparation of solid elastomers.

EP-394487 discloses the use of high molecular weight polyether polyols having low unsaturation levels for making flexible foams having a low resonant frequency; preferably such polyols are used as the matrix for so called polymer-dispersed polyols. EP-443614 discloses an improvement of EP-394487: it becomes sometimes hard to satisfactorily mix starting materials in the preparation of a polyurethane foam because of the high viscosity of the polyols; in order to overcome this a viscosity reducing compound having an addition-polymerizable unsaturated group is added in EP-443614, like e.g. a methacrylate type compound, vinylether type compound, a vinylester type compound, an alkylether type compound and an alkylester type compound.

EP-422811 discloses the use of a polyisocyanate for preparing flexible polyurethane foams having good elasticity and elongation properties; the polyisocyanate is a prepolymer made from polyether polyols having a high molecular weight. The NCO content of the prepolymer used is rather high, which means the amount of polyol in the prepolymer is limited.

GB 2296499 discloses the use of a prepolymer composition for producing microcellular molded articles. Although a wide range of polyols have been disclosed for use in the prepolymer composition and the resin side component, there is no special attention given to the use of polyols having a high molecular weight and certainly not to the use of such polyols in the preparation of water blown flexible foams. The amounts of water used are low and products obtained are microcellular elastomers of high density.

EP-420273 is related to a process for making flexible foams using prepolymer compositions in order to make soft foams with a low shore A hardness. No attention is given to the problems encountered when using polyols with a high molecular weight.

EP-485953 is related to improving elongation of flexible foams by using prepolymers made from polyols having a high molecular weight and a relatively high oxyethylene content.

WO 95/18163 is related to the preparation of rigid polyurethane foams using a prepolymer made by reacting polymeric MDI and a polyol having a molecular weight of at least 2000 and a relatively high oxyethylene content.

EP-392788 is related to isocyanate-terminated prepolymers and the use of them in making flexible foams. The prepolymers used have been made from polyols having a relatively low molecular weight and in preparing a flexible polyurethane foam a resin-side is used which does not contain polyol.

It is known that polyols having a high molecular weight have a higher viscosity than polyols having a low molecular weight. In EP-443614 it was recognised that such high viscosity could lead to processing difficulties; these difficulties were diminished by adding a viscosity reducing compound.

EP-111121, EP-344551, WO95/34589, WO95/34590 and WO95/34591 further disclose the use of prepolymers for preparing flexible foams; no special directions are given as to the use of polyols having a high molecular weight.

When higher amounts of high molecular weight polyols are used the processing difficulties would be more pronounced. It was found that in the preparation of MDI (diphenylmethane diisocyanate)-based, water-blown flexible polyurethane foams the viscosity of the mixture of the water and the polyol increased in the same way as the viscosity of the polyol, with increasing molecular weight. Surprisingly it was found that the viscosity of a prepolymer did not give rise to a viscosity commensurate with the viscosity of the polyol used; the viscosity of a prepolymer containing a high amount of a polyol having a high molecular weight was only slightly higher than the viscosity of a prepolymer made from a high amount of a polyol having a lower molecular weight despite the fact that the viscosity of these polyols differed remarkably. Therefore the present invention is concerned with such prepolymer compositions and with a process for making flexible foams by reacting such prepolymer compositions with an isocyanate-reactive compound or composition using water as blowing agent. The processing is much improved, even in the absence of viscosity reducing agents. The foams show very good properties, in particular a high ball rebound and a low compression set.

Consequently the present invention is concerned with an isocyanate-terminated prepolymer composition comprising 1) a urethane containing adduct of diphenylmethane diisocyanate optionally containing oligomers of it having an isocyanate functionality of more than 2 and of a polyether polyol 1), having an equivalent weight of 2200–10000, an oxyethylene content of 5–30% by weight and an average nominal hydroxyl functionality of 2–4, the amount the polyether moieties being 35–70% by weight and 2) 2 to 15% by weight of unreacted oligomers of diphenylmethane diisocyanate, said oligomers having an isocyanate functionality of at least 3, and/or 1 to 25% by weight of toluene diisocyanate, all amounts being calculated on the total weight of the composition, the composition having an NCO-content of 8–22% by weight when no toluene diisocyanate is present and an NCO-content of 8.5–26% by weight when toluene diisocyanate is present.

Further the present invention is concerned with a process for preparing a flexible polyurethane foam by reacting the above isocyanate-terminated prepolymer composition with a polyether polyol 2) having an equivalent weight of from 1000 to less than 2200 and a nominal functionality of from 2–4 and with water optionally using chain extenders, cross-linkers, auxiliaries and additives.

The above prepolymer composition according to the invention preferably has an NCO content of 10–20% by weight when no toluene diisocyanate is present and of 11–24% by weight when toluene diisocyanate is present, and a viscosity of at most 4500 mPa.sec at 25° C. (Brookfield). The equivalent weight of polyol 1) preferably is 2500–8000 and most preferably 3000–7000; its average nominal functionality is most preferably 3.

In the context of the present invention the following terms have the following meaning:

1) isocyanate index or NCO index or index: the ratio of NCO-groups over isocyanate-reactive hydrogen atoms present in a formulation given as a percentage:

$$\frac{[NCO] \times 100 \,(\%)}{[\text{active hydrogen}]}.$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of the water) present at the actual foaming stage are taken into account.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual foaming process one hydroxyl group is considered to comprise one reactive hydrogen, one primary amine group is considered to comprise one reactive hydrogen and one water molecule is considered to comprise two active hydrogens.

3) Reaction system a combination of components wherein the polyisocyanates are kept in one or more containers separate from the isocyanate-reactive components.

4) The expression "polyurethane foam" as used herein refers to cellular products as obtained by reacting polyisocyanates with isocyanate-reactive hydrogen containing compounds, using foaming agents, and in particular includes cellular products obtained with water as reactive foaming agents (involving a reaction of water with isocyanate groups yielding urea linkages and carbon dioxide and producing polyurea-urethane foams) and with polyols, aminoalcohols and/or polyamines as isocyanate-reactive compounds.

5) The term "average nominal hydroxyl functionality is used herein to indicate the number average functionality (number of hydroxyl groups per molecule) of the polyol or polyol composition on the assumption that this is the number average functionality (number of active hydrogen atom per molecule) of the initiator(s) used in their preparation although in practice it will often be somewhat less because of some terminal unsaturation.

6) The word "average" refers to number average unless indicated otherwise. If the words functionality, equivalent weight or molecular weight are used without the preceeding words "average" or "number average" then nevertheless the number average value is meant.

7) "Polyether moieties" refers to the part of the polyol which is left in the urethane containing adduct after this polyol and polyisocyanate have reacted to form such adduct.

The urethane containing adduct in the prepolymer composition according to the invention is prepared by mixing an excessive amount of the polyisocyanate with the polyol 1) and allowing the mixture to react. Such reaction is allowed to take place at 60–100° C. and in general the use of catalyst is not necessary. The relative amount of polyisocyanate and polyol depends on the desired NCO-value, the NCO-value of the polyisocyanate and the OH value of the polyol used and can be easily calculated by those skilled in the art.

The polyisocyanate used to react with polyol 1) may be selected from diphenylmethane diisocyanate (MDI) and MDI in admixture with its oligomers having an isocyanate functionality of at least 3 (in the art known as crude or polymeric MDI).

The diphenylmethane diisocyanate (MDI) used for making the prepolymer may be selected from pure 4,4'-MDI and isomeric mixtures of 4,4'-MDI and 2,4'-MDI and less than 10% by weight of 2,2'-MDI and modified variants thereof containing carbodiimide, uretonimine, isocyanurate, urethane, allophanate, urea or biuret groups. Most preferred are pure 4,4'-MDI, isomeric mixtures with 2,4'-MDI preferably containing 5–50% and more preferably 5–35% by weight of 2,4'-MDI, and uretonimine and/or carbodiimide modified MDI having an NCO content of at least 25% by weight and urethane modified MDI obtained by reacting excess MDI and a polyol, having an average nominal hydroxyl functionality of 2–6 and a number average molecular weight of 60–999, and having an NCO content of at least 25% by weight.

As said, mixtures of MDI with its oligomers having an isocyanate functionality of at least 3 may be used as well for preparing the urethane containing adducts. Such mixtures are known in the art as polymeric MDI or crude MDI and more generally as polymethylene polyphenylene polyisocyanates which are made by the phosgenation of a mixture of polyamines obtained by the acid condensation of aniline and formaldehyde. The manufacture of both the polyamine mixtures and the polyisocyanate mixtures is well known. The condensation of aniline with formaldehyde in the presence of strong acids such as hydrochloride acid gives a reaction product containing diaminodiphenylmethane together with polymethylene polyphenylene polyamines of higher functionality, the presice composition depending in known manner on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisocyanates in the crude diphenylmethane diisocyanate compositions determine the average functionality of the compositions, that is the average number of isocyanate groups per molecule. By varying the proportions of starting materials, the average functionality of the polyisocyanate compositions can be varied from little more than 2 to 3 or even higher. In practice, however, the number average isocyanate functionality preferably ranges from 2.35 to 2.9. The NCO value of these polymeric MDIs is at least 30% by weight and at most 33% by weight. Such compositions contain from 20 to 80 and preferably 30–70% by weight of diphenylmethane diisocyanate, the remainder being polymethylene polyphenylene polyisocyanates of isocyanate functionality of at least 3 together with by-products formed in the manufacture of such polyisocyanates by phosgenation. These products, being liquids, are convenient to use according to the present invention. The MDI optionally containing oligomers having an isocyanate functionality of 3 or more preferably contains 5–50 and most preferably 5–35% by weight of 2,4'-MDI; this provides for good prepolymer storage stability and low density foams having good foam stability.

Polyether polyol 1) for preparing the urethane containing adduct may be selected from products obtained by the polymerisation of ethylene oxide and another cyclic oxide, like propylene oxide, butylene oxide or tetrahydrofuran in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol and pentaerythritol. Mixtures of initiators and/or other cyclic oxides may be used.

Especially useful polyether polyols include polyoxyethylene polyoxypropylene diols and triols obtained by the simultaneous and/or sequential addition of ethylene oxide and propylene oxide to di- or trifunctional initiators as fully described in the prior art. Random copolymers, block copolymers and random/block copolymers of ethylene oxide and propylene oxide having an oxyethylene content of 5–30% by weight, (all based on the total weight of oxyalkylene units), are preferred, in particular those having at least part and most preferably all of the oxyethylene groups at the end of the polymer chain, i.e. so called EO-tipped polyols. Mixtures of the said diols and triols may be used as well.

After preparation of the urethane containing adduct additional MDI may be added. After preparation of the urethane containing adduct polymeric or crude MDI is added so as to obtain an isocyanate-terminated prepolymer composition according to the present invention which contains 2 to 15% by weight of unreacted oligomers of MDI having an isocyanate functionality of 3 or more, calculated on the whole prepolymer composition. The polymeric or crude MDI which is used is selected from those described before. The amount added is such that the amount of unreacted oligomers or unreacted polymethylene polyphenylene polyisocyanates having an isocyanate functionality of at least 3 is 2–15% by weight calculated on the total isocyanate-terminated prepolymer composition.

In addition to or instead of the addition of polymeric or crude MDI toluene diisocyanate may be added to the urethane containing adducts which toluene diisocyanate may be 2,4-toluene diisocyanate, 2,6-toluene diisocyanate or mixtures thereof, in an amount of 1 to 25% and preferably 5–20% by weight calculated on the prepolymer composition including said added toluene diisocyanate.

It is to be understood that within the limits of the isocyanate-terminated prepolymer composition as to the amount of polyol 1), as to the amount of unreacted oligomers of MDI having a functionality of at least 3 and as to the amount of toluene diisocyanate are such that prepolymer compositions can be made having as NCO-content outside the indicated ranges, such compositions however do not form part of the present invention.

The prepolymer compositions according to the present invention are used to prepare flexible polyurethane foams by reacting these compositions with a polyether polyol having an equivalent weight of from 1000 to less than 2200 and a nominal functionality of from 2 to 4 and with water. These polyether polyols include products obtained by the polymerization of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water, butanediol, ethylene glycol, propylene glycol, ethanolamine, diethanolamine, triethanolamine, toluene diamine, diethyl toluene diamine, cyclohexane diamine, cyclohexane dimethanol, glycerol, trimethylolpropane and 1,2,6-hexanetriol and the other initiators mentioned before. Mixtures of initiators and/or cyclic oxides may be used.

Especially useful polyether polyols include polyoxypropylene diols and triols and polyoxyethylene polyoxypropylene diols and triols obtained by the simultaneous or sequential addition of ethylene and propylene oxides to di- or trifunctional initiators as fully described in the prior art. Random copolymers having oxyethylene contents of 10–80%, block copolymers having oxyethylene contents of up to 50%, based on the total weight of oxyalkylene units may be mentioned, in particular those having at least part of the oxyethylene groups at the end of the polymer chain. Mixtures of the said diols, and triols can be particularly useful.

Other polyols which may be used as polyol 2) comprise dispersions or solutions of addition or condensation polymers in polyols of the types described above. Such modified polyols, often referred to as "polymer polyol", have been fully described in the prior art and include products obtained by the in situ polymerization of one or more vinyl monomers, for example styrene and/or acrylonitrile, in polymeric polyols, for example polyether polyols, or by the in situ reaction between a polyisocyanate and an amino- and/or hydroxy-functional compound, such as triethanolamine, in a polymeric polyol. Polyoxyalkylene polyols containing from 5 to 50% by weight of dispersed polymer are particularly useful. Particle sizes of the dispersed polymers of less than 50 microns are preferred.

Most preferred are polyoxyethylene polyoxypropylene polyols having an equivalent weight of 1100–2100, a nominal functionality of 2–3 and an oxyethylene content of 5–30% by weight, preferably having the oxyethylene groups at the end of the polymer chain.

The amount of polyol having an equivalent weight of from 1000 to less than 2200 preferably is 20–90 and more preferably 35–90 parts by weight per 100 parts by weight of prepolymer composition.

The foam forming reaction of the prepolymer composition, the polyol and the water is conducted at an isocyanate index of 40–120 preferably of 50–110.

The amount of water used may vary of from 2 to 8 parts by weight per 100 parts by weight of prepolymer composition. If desired, additional blowing agents may be used, in particular inert gases like $CO_2$ and $N_2$.

Optionally chain-extending and cross-linking agents may be used having an equivalent weight of less than 1000, like those selected from amines and polyols containing 2–8 and preferably 2–4 amine and/or hydroxy groups like ethanolamine, diethanolamine, triethanolamine, ethylene glycol, diethylene glycol, triethylene glycol, propylene glycol, dipropylene glycol, butanediol, glycerol, trimethylolpropane, pentaerythritol, sorbitol, sucrose, polyethylene glycol and other polyethylene polyols having one of the other initiators as initiators, toluene diamine, diethyl toluene diamine, cyclohexane diamine, phenyl diamine, diphenylmethane diamine, alkylated diphenylmethane diamine and ethylene diamine.

The amount of chain-extending and cross-linking agents is, if applied, up to 25 and preferably up to 10 parts by weight per 100 parts by weight of the prepolymer composition.

Optionally auxiliaries and additives may be used, like formation of urea and urethane enhancing catalysts like tertiary amines and tin compounds, surfactants, stabilizers, flame retardants, fillers and anti-oxidants.

The flexible polyurethane foams are prepared by combining and mixing the ingredients and allowing the mixture to foam. Preferably the isocyanate-reactive ingredients and the auxiliaries and additives are premixed and subsequently combined in the mixing head with the prepolymer composition. The ingredients of the prepolymer composition may be fed to the mixing head independently from each other, if desired.

The process may be used to make slab-stock or moulded flexible foams. The foams in general have a density of 15–80 kg/m$^3$ and may be used as cushioning material in furniture, car seats and mattresses.

The present invention is illustrated by the following examples.

EXAMPLE 1

The following polyoxypropylene polyoxyethylene polyols were used to prepare isocyanate-terminated prepolymers:

| Polyol | 1 | 2 | 3 |
|---|---|---|---|
| Initiator | glycerol | glycerol | glycerol |
| Oxyethylene content (all tipped) | 15% w | 15% w | 15% w |
| Equivalent weight | 1900 | 2400 | 3700 |
| Viscosity at 25° C. (mPa · s) | 1100 | 1700 | 3600 |

Prepolymers were made from these polyols, said prepolymers having an NCO value of about 7% by weight by allowing these polyols to react with 4,4'-diphenylmethane diisocyanate containing 10% by weight of the 2,4'-isomer (the weight ratio of polyol to polyisocyanate was about 75/25) at a temperature of about 85° C. for 2.5 hours using thionylchloride at 10 ppm (calculated on MDI). Then prepolymers were made having an NCO content of 12% by weight by adding an appropriate amount of 4,4'-diphenylmethane diisocyanate containing 20% w of the 2,4'-isomer.

EXAMPLE 2

Moulded flexible polyurethane foams were made from these prepolymers having an NCO-content of 12% by weight. In a number of experiments polymeric MDI (NCO=30.7%w; isocyanate functionality=2.7; diisocyanate content=38% w the remainder being polyisocyanates having an isocyanate functionality of 3 or more and having a 2,4'-MDI content=2% w) was premixed with the prepolymer; in another number of experiments said polymeric MDI and TDI (2,4/2,6=80/20 w/w) were premixed with the prepolymer. 100 parts by weight of these prepolymer compositions were mixed with a polyol composition and poured in a mould and allowed to react. The polyol composition comprised 65 parts by weight (pbw) of polyol 1,2 or 3; 0.5 pbw of B4113 a silicone surfactant from Goldschmidt; 0.5 pbw of X8154, a catalyst from Air Products; 0.05 pbw of Niax Al, a catalyst from Union Carbide; 3 pbw of triethanolamine, 3 pbw of water; and 3 pbw of ethoxylated sorbitol having a molecular weight of about 1800.

Further details are given in the table below. After demoulding properties of the foams were measured; results are in the table below as well.

|  | Experiment | | | | | | | |
|---|---|---|---|---|---|---|---|---|
|  | 1* | 2 | 3 | 4* | 5* | 6* | 7 | 8* |
| Prepolymer from polyol (pbw) | 1(81) | 2(81) | 3(81) | 2(81) | 3(81) | 1(78) | 3(78) | 3(78) |
| Polymeric MDI, pbw | 19 | 19 | 19 | 19 | 19 | 10 | 10 | 10 |
| TDI, pbw | — | — | — | — | — | 12 | 12 | 12 |
| Polyol in polyol composition | 1 | 1 | 1 | 2 | 3 | 1 | 1 | 3 |
| Core density, kg/m$^3$(ISO/DIS845) | 62 | 61 | 59 | 60 | 61 | 58 | 54 | 53 |
| CLD, 40%, kPa (ISO3386) | 5.7 | 5.4 | 4.4 | 5.3 | 3.5 | 6 | 4.4 | 3.3 |
| Ball rebound, % (TSM 7100-4.7) | 65 | 69 | 70 | 72 | 74 | 69 | 74 | 78 |
| Compression set |  |  |  |  |  |  |  |  |
| dry | 3 | 2.5 | 3 | 2 | 2 | 3 | 2 | 2 |
| humid | 4.5 | 5 | 4 | 4 | 4 | 6 | 5.5 | 4 |
| (TSM 7100-4.8 AND 4.9) |  |  |  |  |  |  |  |  |
| Processing | + | + | + | − | − | + | + | − |

*Comparative experiment
Processing + means: easy to mix: smooth product spread in mould; no problem related to flow of reacting material.
Processing − means: difficult to mix; clear sign of flow defficiency.
TSM: Toyota standard method

What is claimed is:

1. A process for preparing a flexible polyurethane foam comprising reacting:

water;

a polyether polyol having an equivalent weight of 1,000 to less than 2200, and a nominal hydroxyl functionality of 2–4; and an isocyanate-terminated prepolymer composition comprising:
- A) a urethane containing adduct of:
    - (i) diphenylmethane diisocyanate, optionally containing oligomers of diphenylmethane diisocyanate, said oligomers having an isocyanate functionality of more than 2, and
    - (ii) a polyoxyethylene polyoxypropylenepolyether polyol, having
        - (a) an equivalent weight of 2,200–10,000,
        - (b) a nominal hydroxyl functionality of 2–4,
        - (c) an oxyethylene content of 5–30% by weight, relative to the total weight of oxyalkylene units present,
- B) (i) 2–15% by weight, relative to the composition, of unreacted oligomers of diphenylmethane diisocyanate, said oligomers having an isocyanate functionality of at least 3, and/or
    - (ii) 1–25% by weight, relative to the composition, of toluene diisocyanate;

wherein said isocyanate-terminated prepolymer composition has an NCO-content of 8–22% by weight, relative to the composition, when no toluene diisocyanate is present and an NCO-content of 8.5–26% by weight, relative to the composition, when toluene diisocyanate is present, and the polyether moieties are present in an amount of from 35–70% by weight, relative to the weight of the composition.

2. A process according to claim 1, wherein the amount of the polyether polyol is 20–90 parts by weight per 100 parts by weight of the isocyanate-terminated prepolymer composition.

3. A process according to claim 2, wherein the amount of the polyether polyol is 35–90 parts by weight per 100 parts by weight of the isocyanate-terminated prepolymer composition.

4. A process according to claim 1, wherein the amount of water is 2–8 parts by weight per 100 parts by weight of the isocyanate-terminated prepolymer composition, and wherein the isocyanate index is 50–110.

5. A process according to claim 2, wherein the amount of water is 2–8 parts by weight per 100 parts by weight of the isocyanate-terminated prepolymer composition, and wherein the isocyanate index is 50–110.

6. A process according to claim 3, wherein the amount of water is 2–8 parts by weight per 100 parts by weight of the isocyanate-terminated prepolymer composition, and wherein the isocyanate index is 50–110.

7. A process according to claim 1, wherein said process is conducted in the presence of chain extenders, crosslinkers, auxiliaries, additives, or mixtures thereof.

8. A process according to claim 1, wherein said polyoxyethylene polyoxypropylenepolyether polyol is selected from random copolymers, block copolymers, random/block copolymers or mixtures thereof.

9. A process according to claim 1, wherein said polyoxyethylene polyoxypropylenepolyether polyol is an ethyleneoxide-tipped polyol.

* * * * *